US009950651B2

United States Patent
Delling et al.

(10) Patent No.: US 9,950,651 B2
(45) Date of Patent: Apr. 24, 2018

(54) MOTOR VEHICLE ACCESSORY SUCH AS AN ARMREST

(71) Applicant: GRAMMER AG, Amberg (DE)

(72) Inventors: Gerhard Delling, Schmidgaden (DE); Erwin Himmelhuber, Sulzbach-Rosenberg (DE); Hubert Keller, Kuemmerbruck (DE)

(73) Assignee: GRAMMER AG, Amberg (DE)

( * ) Notice: Subject to any disclaimer, the term of this patent is extended or adjusted under 35 U.S.C. 154(b) by 7 days.

(21) Appl. No.: 15/348,002

(22) Filed: Nov. 10, 2016

(65) Prior Publication Data

US 2017/0136923 A1    May 18, 2017

(30) Foreign Application Priority Data

Nov. 17, 2015    (DE) ........................ 10 2015 014 723

(51) Int. Cl.
| | |
|---|---|
| *B60R 7/00* | (2006.01) |
| *B60N 2/46* | (2006.01) |
| *B60N 2/68* | (2006.01) |
| *B60N 2/44* | (2006.01) |
| *F16C 11/04* | (2006.01) |

(52) U.S. Cl.
CPC ......... *B60N 2/4633* (2013.01); *B60N 2/4435* (2013.01); *B60N 2/4606* (2013.01); *B60N 2/682* (2013.01); *F16C 11/04* (2013.01); *B60Y 2306/09* (2013.01); *B60Y 2410/102* (2013.01); *F16C 2226/80* (2013.01); *F16C 2326/08* (2013.01)

(58) Field of Classification Search
CPC ......... H01L 2924/00; H01L 2924/0002; H01L 2924/181; H01L 2224/48091; A61K 2300/00; B60N 2/4606; B60N 2/4633; G09F 3/0317; G09F 3/0329; Y10T 292/51
USPC ....................................................... 296/37.8
See application file for complete search history.

(56) References Cited

U.S. PATENT DOCUMENTS

| | | | |
|---|---|---|---|
| 3,890,672 A | 6/1975 | Berthagen | |
| 4,052,103 A | 10/1977 | Steinthal | |
| 5,597,209 A * | 1/1997 | Bart ..................... | B60N 2/4633 297/411.32 |
| 5,832,566 A | 11/1998 | Quek et al. | |
| 5,984,416 A * | 11/1999 | Waldo ..................... | A47C 1/03 297/411.32 |
| 6,018,847 A * | 2/2000 | Lu ......................... | F16M 11/10 16/307 |

(Continued)

FOREIGN PATENT DOCUMENTS

| | | |
|---|---|---|
| DE | 102011121457 A1 | 6/2013 |
| EP | 0566213 A2 | 4/1993 |
| EP | 2316690 A | 5/2011 |

*Primary Examiner* — Kiran B Patel
(74) *Attorney, Agent, or Firm* — Andrew Wilford

(57) ABSTRACT

The invention relates to a motor-vehicle accessory, comprising a first part and at least one second part pivotal about an axis (a) relative to the first part in at least one bearing assembly (20a, 20b), and the bearing assembly (20a, 20b) comprises a bearing pin (14) on which a bearing sleeve (22) is coaxial to the bearing axis (a), and the bearing pin (14) forms a head (19) with an axial retaining face (30).

The particularity is that of the bearing pin (14) having first coupling formation that engages in a second coupling formation of the bearing sleeve (22) and prevents relative rotation in a pivot direction ($u_1$, $u_2$) between the bearing sleeve (22) and the bearing pin (14).

10 Claims, 8 Drawing Sheets

(56) References Cited

U.S. PATENT DOCUMENTS

| | | | | |
|---|---|---|---|---|
| 6,033,015 A * | 3/2000 | Husted | B60N 2/4686 | 16/307 |
| 6,257,668 B1 * | 7/2001 | Chou | A47C 1/03 | 297/411.32 |
| 6,328,384 B1 * | 12/2001 | Yamauchi | B60N 2/4606 | 297/411.29 |
| 6,467,847 B2 * | 10/2002 | Bidare | B60N 2/4606 | 297/411.3 |
| 6,578,922 B2 * | 6/2003 | Khedira | B60N 2/4673 | 297/115 |
| 6,652,032 B2 * | 11/2003 | Laval | B60N 2/4606 | 297/411.32 |
| 6,832,412 B2 * | 12/2004 | Kim | B60N 2/4686 | 16/354 |
| 6,916,068 B2 * | 7/2005 | Kitamura | A47C 1/03 | 297/115 |
| 7,077,477 B1 * | 7/2006 | Syrowik | B60N 2/4606 | 297/411.25 |
| 7,185,952 B1 * | 3/2007 | Chen | B60N 2/28 | 297/411.38 |
| 7,284,799 B2 | 10/2007 | Chung | | |
| 7,393,058 B2 * | 7/2008 | Omori | B60N 2/4633 | 297/115 |
| 7,614,674 B2 * | 11/2009 | Shiono | B60R 7/04 | 296/24.34 |
| 7,926,878 B2 * | 4/2011 | Amin | B60N 2/4613 | 297/411.32 |
| 8,047,592 B2 * | 11/2011 | Cho | B60N 2/4686 | 16/337 |
| 8,074,832 B2 * | 12/2011 | Fujiwara | B60N 2/4686 | 220/811 |
| 8,662,594 B2 * | 3/2014 | Faccin | B60N 2/4633 | 248/118 |
| 8,967,425 B2 * | 3/2015 | Lee | H05K 5/0226 | 220/830 |
| 9,156,385 B1 * | 10/2015 | Lewis | B60N 2/4633 | |
| 9,821,691 B2 * | 11/2017 | Brockman | B60N 2/4445 | |
| 2001/0020799 A1 * | 9/2001 | Bullesbach | B60N 2/4633 | 297/411.38 |
| 2002/0089217 A1 * | 7/2002 | Scheerhorn | B60N 2/4646 | 297/188.19 |
| 2004/0124687 A1 * | 7/2004 | Nae | B60N 2/4613 | 297/411.32 |
| 2006/0108816 A1 * | 5/2006 | Radu | B60N 2/4606 | 296/24.34 |
| 2009/0026826 A1 * | 1/2009 | Cebula | B60N 2/4606 | 297/411.32 |
| 2009/0284034 A1 * | 11/2009 | Nuss | B60N 2/4606 | 296/1.07 |
| 2015/0158402 A1 * | 6/2015 | Faruque | B60N 2/4666 | 297/411.22 |
| 2015/0258923 A1 * | 9/2015 | Skapof | B60N 2/4606 | 296/24.34 |
| 2015/0343925 A1 * | 12/2015 | Bohlke | B60N 2/4606 | 297/411.32 |

* cited by examiner

MOTOR VEHICLE ACCESSORY SUCH AS AN ARMREST

The invention initially relates to a motor-vehicle accessory.

Such a motor-vehicle accessory is for example an armrest of a vehicle seat. The armrest is known from prior public use. It comprises an arm pivotal about an axis on a support. The support is for example formed by the frame of the vehicle seat or of the vehicle. The axis is formed for example by two screws that are seated on the support and pass through respective bores in the opposite sides of the arm.

In order to increase sliding friction between the mounting screw and the support there is a sleeve, for example of plastic. A respective disk spring is provided on each side of the arm between the support and the arm and biases the arm so it makes no contact with the support, thus preventing rattling. The disk springs are mounted on the cylindrical outer surface of the plastic sleeve that, in turn, is engages the outer surface of the mounting screw. In order to distribute the contact pressure of the disk springs on the surface of the support, an additional washer is provided between the disk spring and the support.

In the prior-art, the friction surface is undefined when the arm is pivoted. Thus relative rotation is possible between the washer and the disk springs, between the disk springs, or between the disk spring and the sleeve. The relative rotation between specific friction partners can result in unwanted noises.

EP 2 316 690 describes an armrest with an arm pivotal on two arm parts. The arm has two bearing plates each pivotal on a respective one of the supporting parts. A plastic clip on the bearing plate is formed with a bore. The bore is aligned with a bore of the bearing plate. A spring washer is braced between the clip and the flange of a sleeve and has a cylindrical outer surface that passes through a hole of the spring washer as well as the bore of the clip, the side plate and the supporting part and engages with latch arms in the hole in the supporting part from behind. Ramps on the clip interact with wave-like elevations of the spring washer so the contact pressure and thus the braking force acting on the side plates can be adjusted by rotating the spring washer.

The object of the invention is to provide a motor-vehicle accessory with a pivotal part that does not generate disruptive noises when pivoting.

The problem is solved by a motor-vehicle accessory with the features of claim 1.

The motor-vehicle accessory comprises a first part and at least one second part. The second part is pivotal about an axis relative to the first part in at least one bearing assembly that comprises at least one bearing pin. For fastening to the first part or the second part, the bearing pin can for example have a thread. The bearing pin comprises for example a cylindrical surface.

The bearing pin forms, for example, an axial retaining face. The bearing pin forms, for example, a head with an axial retaining face. According to the invention, this means that the retaining face can absorb forces that act axially.

A bearing sleeve is coaxial to the bearing axis. An outer surface of the bearing sleeve is in contact with one of the parts. An inner surface of the bearing sleeve is in contact with the outer surface of the bearing pin. Between the bearing sleeve and one of the parts, there is relative rotation in the form of pivoting around the axis. The bearing sleeve can be made of a material with good anti-friction properties.

The bearing pin is provided with a first coupling formation that engages with a second coupling formation of the bearing sleeve and prevents relative rotation between the bearing sleeve and the bearing pin in the pivoting direction; i.e. the bearing sleeve cannot rotate relative to the bearing pin around the axis due to the interacting coupling formations. For example, if the bearing pin is fixed to the first part, the bearing sleeve is also connected to the first part with regard to movement. If the bearing pin is fixed to the second part, the bearing sleeve is connected to the second part with regard to movement.

The first coupling formation is for example formed on an outer surface of the bearing pin, and the second coupling formation is formed on an inner surface of the bearing sleeve, the inner surface being in contact with the outer surface. The outer surface is for example a surface facing radially outward from the axis. The inner surface is for example a surface radially facing the axis.

The interacting coupling formations are for example formed from tooth systems or polygonal supports.

The bearing pin passes for example through a hole in a holding strut of the vehicle frame and engages in the arm. The arm is for example between two holding struts of the vehicle frame, and a bearing assembly is provided on both sides of the arm, each bearing pin passing through a hole of the respective holding strut and engaging in the arm. In such case, there is relative rotation between the bearing sleeve and the holding strut.

The bearing sleeve forms for example a flange with an axial counterface. According to the invention, this means that the counterface can absorb forces that act axially. For example, the retaining face can absorb forces that act in a first axial direction, and the counterface can absorb forces that act in a second direction opposite the first direction. For example, other parts or parts can be retained by other parts between the retaining face and the counterface. For example, a spring can be retained between the retaining face and the counterface.

For example, at least one functional element is provided between the retaining face and the counterface. Such a functional element is for example a spring or a disk. The functional element is for example formed by a disk spring that axially loads the second part. One or more similar or also different functional elements can be arranged between the retaining face and the counterface.

The bearing pin is for example fixed to the first part or the second part. The connection can be any type of connection, for example screw connection, welded joint, adhesive connection, etc. As a result, the bearing pin swivels together with the connected part and moves relative to the other part. The bearing pin pivots for example together with the second part and moves relative to the first part.

The bearing assembly can for example comprise a disk in contact with the vehicle frame in order to absorb and distribute the forces acting on the vehicle frame.

According to a second aspect of the invention, the invention relates to an armrest for a seat in a vehicle. According to the invention, vehicle seats are seats in land vehicles, aircraft, and watercraft.

The prior art already cited with reference to the first inventive aspect is also relevant for the second inventive aspect, and so reference is made to the above statements in order to avoid repetitions.

The problem addressed by the invention was that of providing an armrest with a pivotal arm that does not generated disruptive noises when pivoting.

The problem was solved by an armrest with the features of claim 10.

The armrest comprises an arm that is pivotal in a bearing assembly about an axis on a vehicle frame. The bearing assembly comprises at least one bearing pin, on which a bearing sleeve is coaxially mounted. The bearing pin is provided with a head that has an axial retaining face. According to the invention, axial retaining face means that the surface can absorb forces acting in the direction of the axis.

Since the features of the characterizing part do not differ from the first aspect of the invention, reference is made to the statements regarding the first aspect.

Further advantages result from the description of an embodiment schematically shown in the drawings in which.

An armrest is generally shown in the drawing at 10. Similar references in different drawings denote corresponding parts, even if lower-case letters or apostrophes are added or omitted.

The armrest 10 comprises an arm 11 provided with a cushion 13 and pivotal on a support leg 12 around an axis a. The support leg 12 is fastened to the vehicle in a manner not shown in detail.

Figure 6:
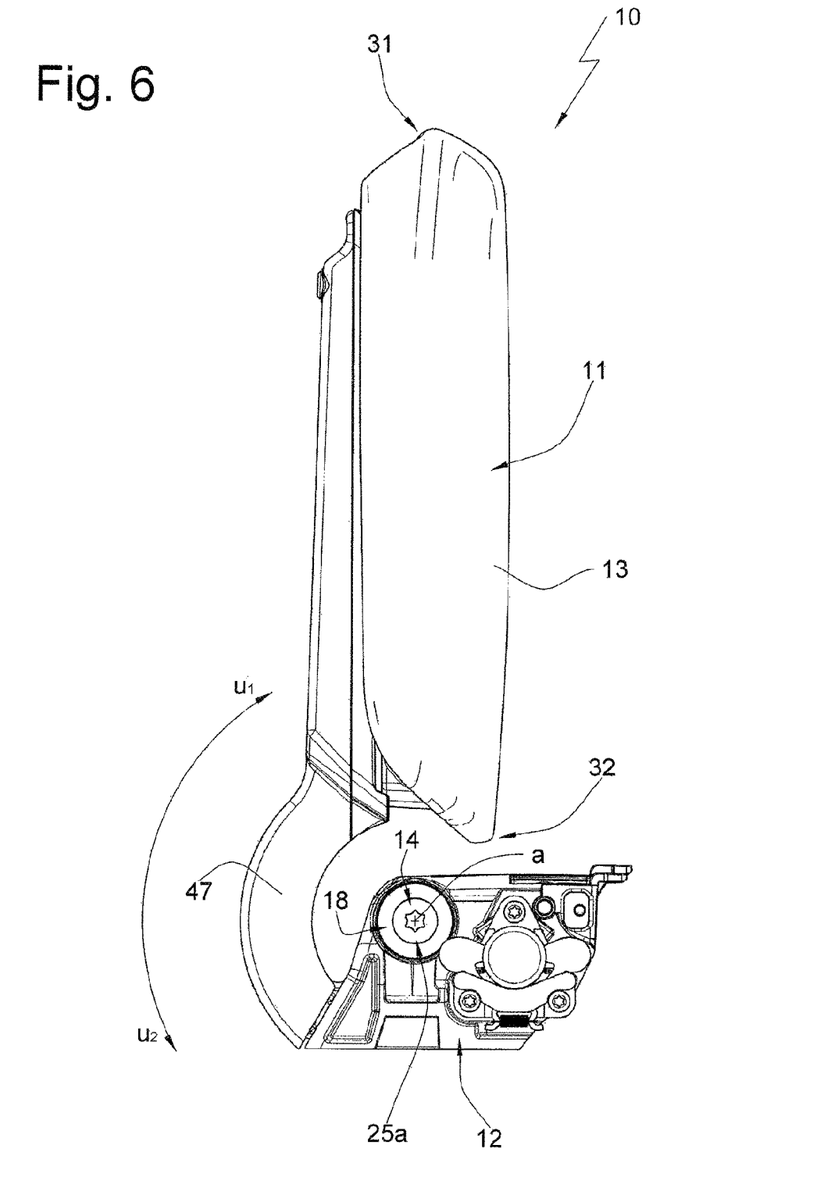
FIG. 6 is a side view with the arm in a second position.
Figure 7:
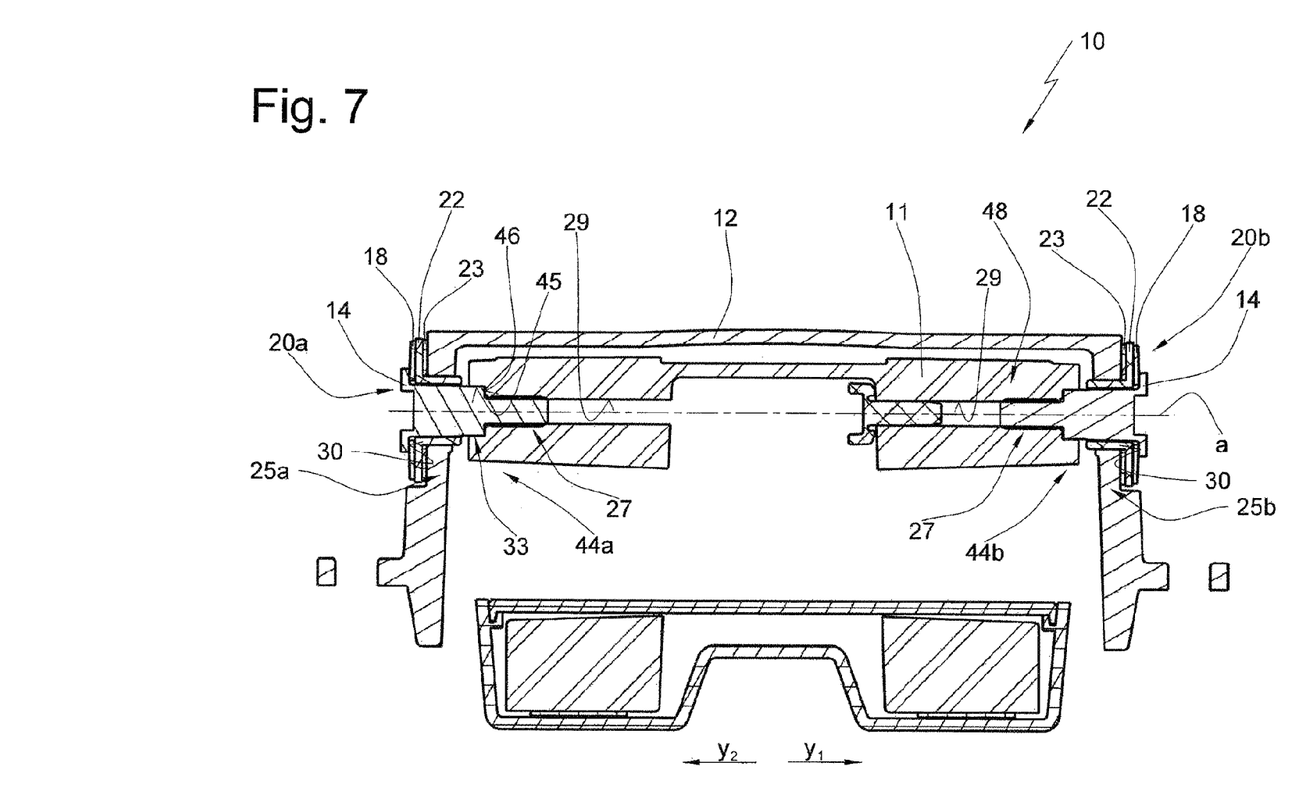
FIG. 7 is a section taken along line VII-VII of FIG. 5.

According to FIGS. 1 to 5, the arm 11 is in a first for example approximately horizontal, position. It can be pivoted around the axis a in a direction $u_1$ to a second, approximately vertical position shown in FIG. 6. From the second position, the armrest can be pivoted back to the first position in direction $u_2$.

The arm 11 has an outer end 31 as well as an inner end 32. The inner end 32 is pivotably connected to the support leg 12. The inner end 32 is connected to ends of supports 47a and 47b. Opposite ends of the supports 47a and 47b are held on an axle 48. Opposite ends 44a and 44b of the axle 48 are formed with a bore 29 whose central axis coincides with the axis a. The axle 48 is between two holding struts 25a and 25b of the support leg 12.

Figure 1:
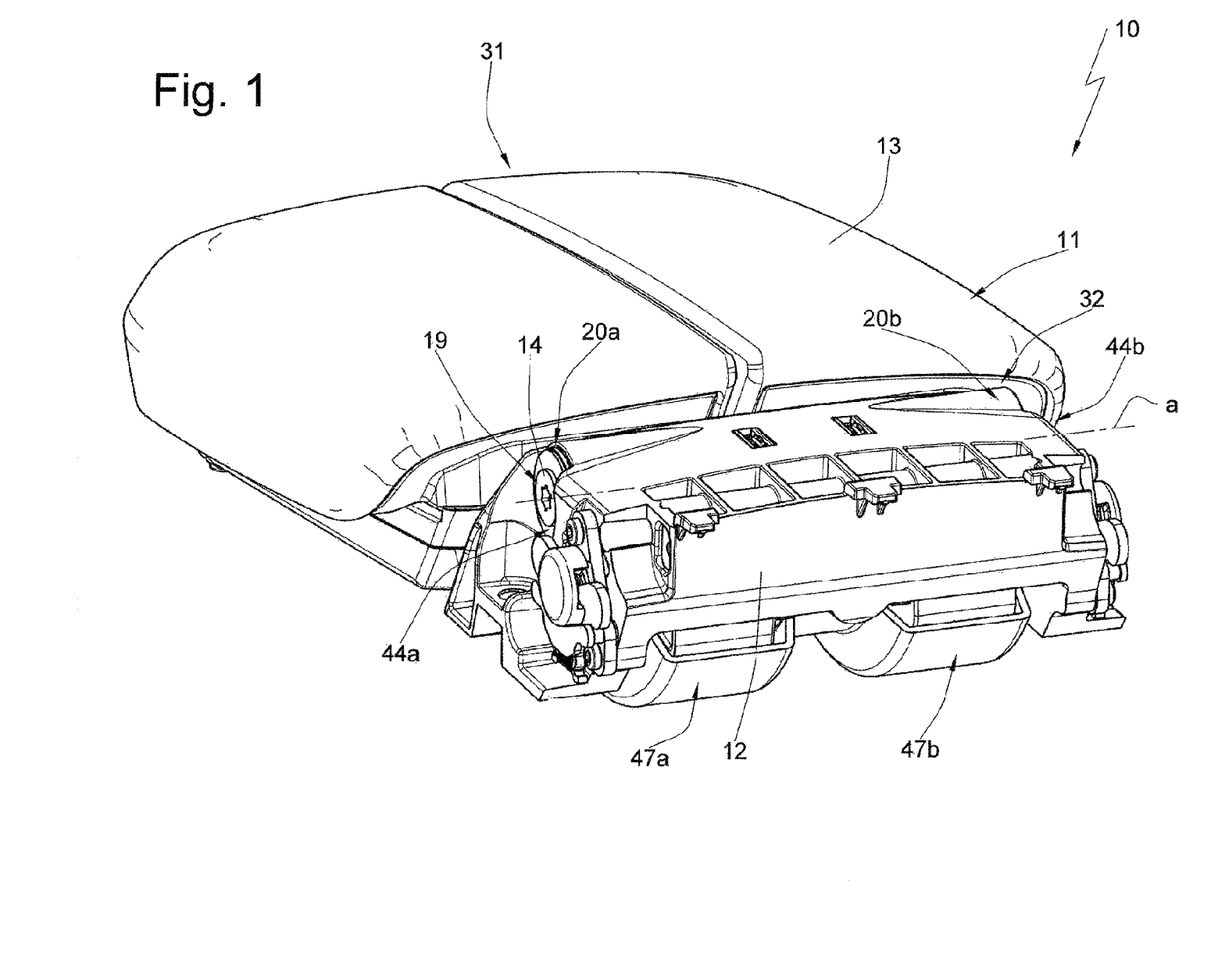
FIG. 1 is a perspective rear view of an armrest with an arm in a first position.
Figure 2:
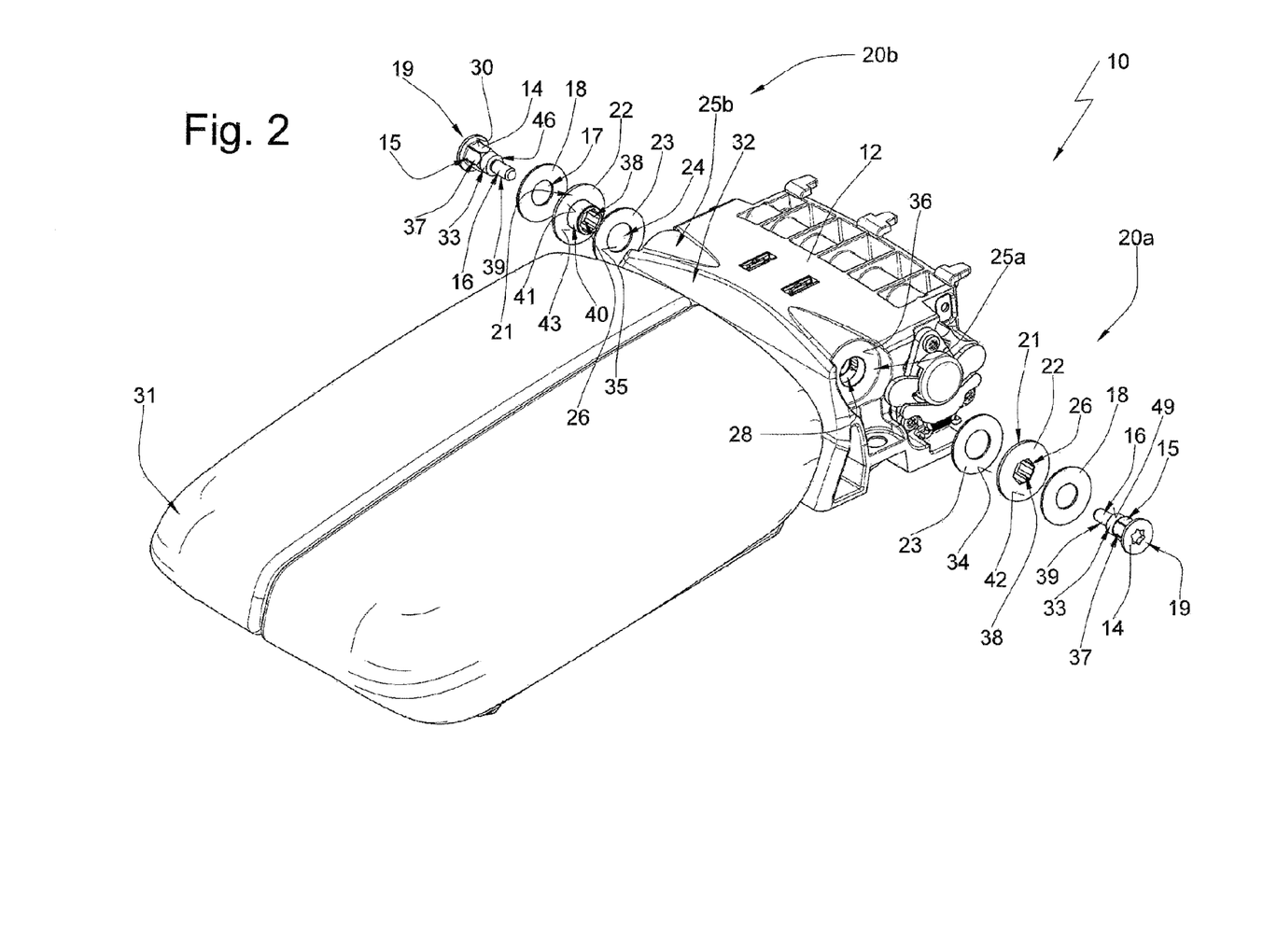
FIG. 2 is a perspective partially exploded view of the armrest from the front.
Figure 3:
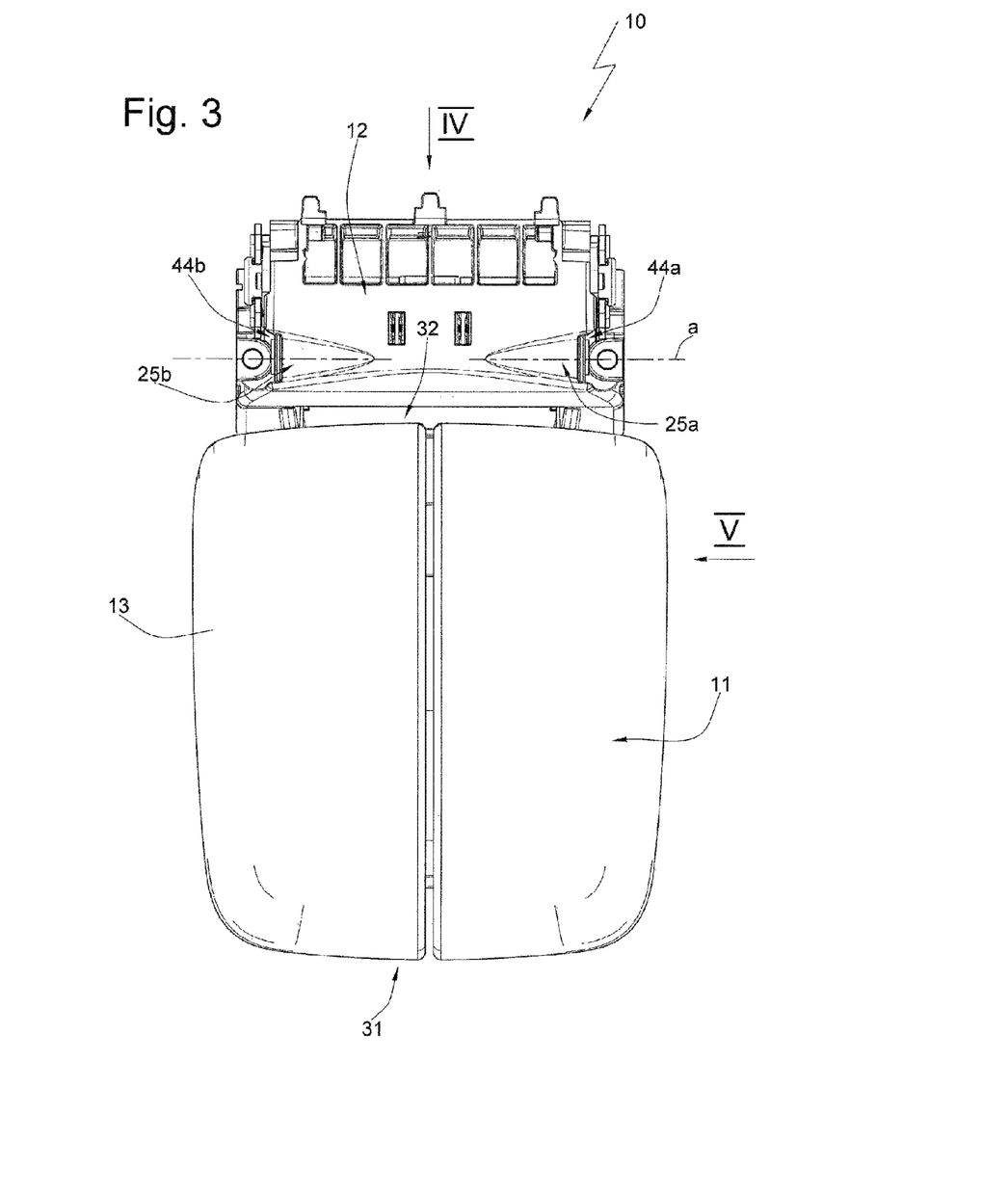
FIG. 3 is a top view of the armrest according to FIG. 1.
Figure 4:
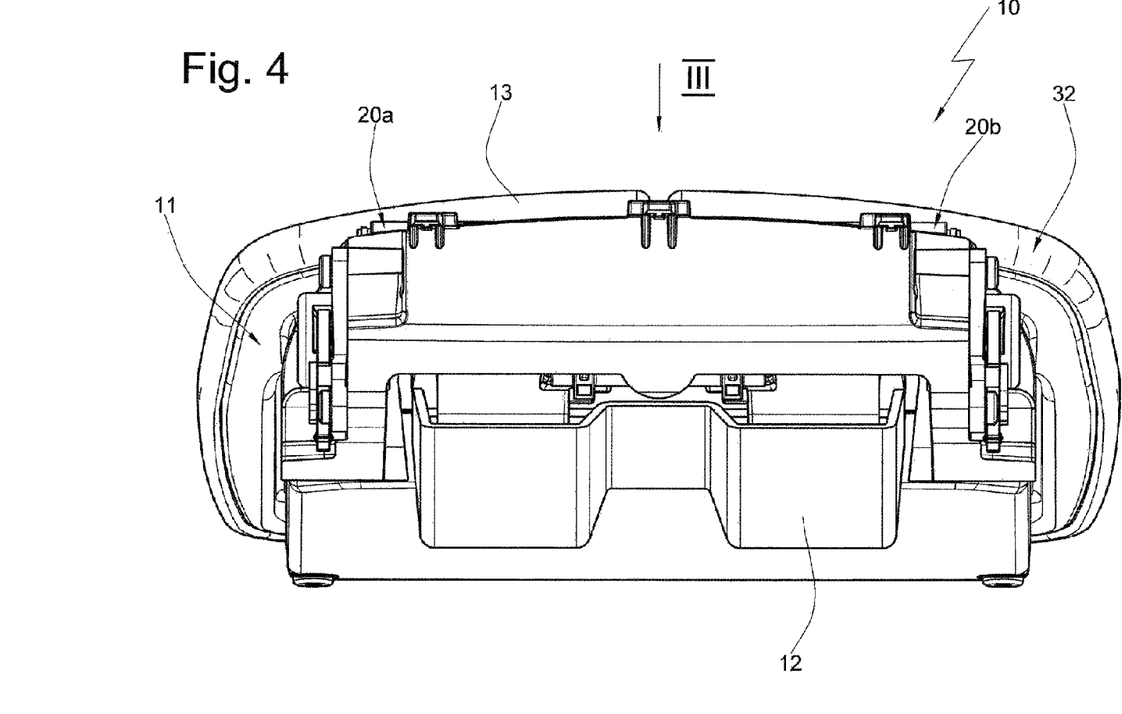
FIG. 4 is a rear view according to arrow IV of FIG. 3.
Figure 5:
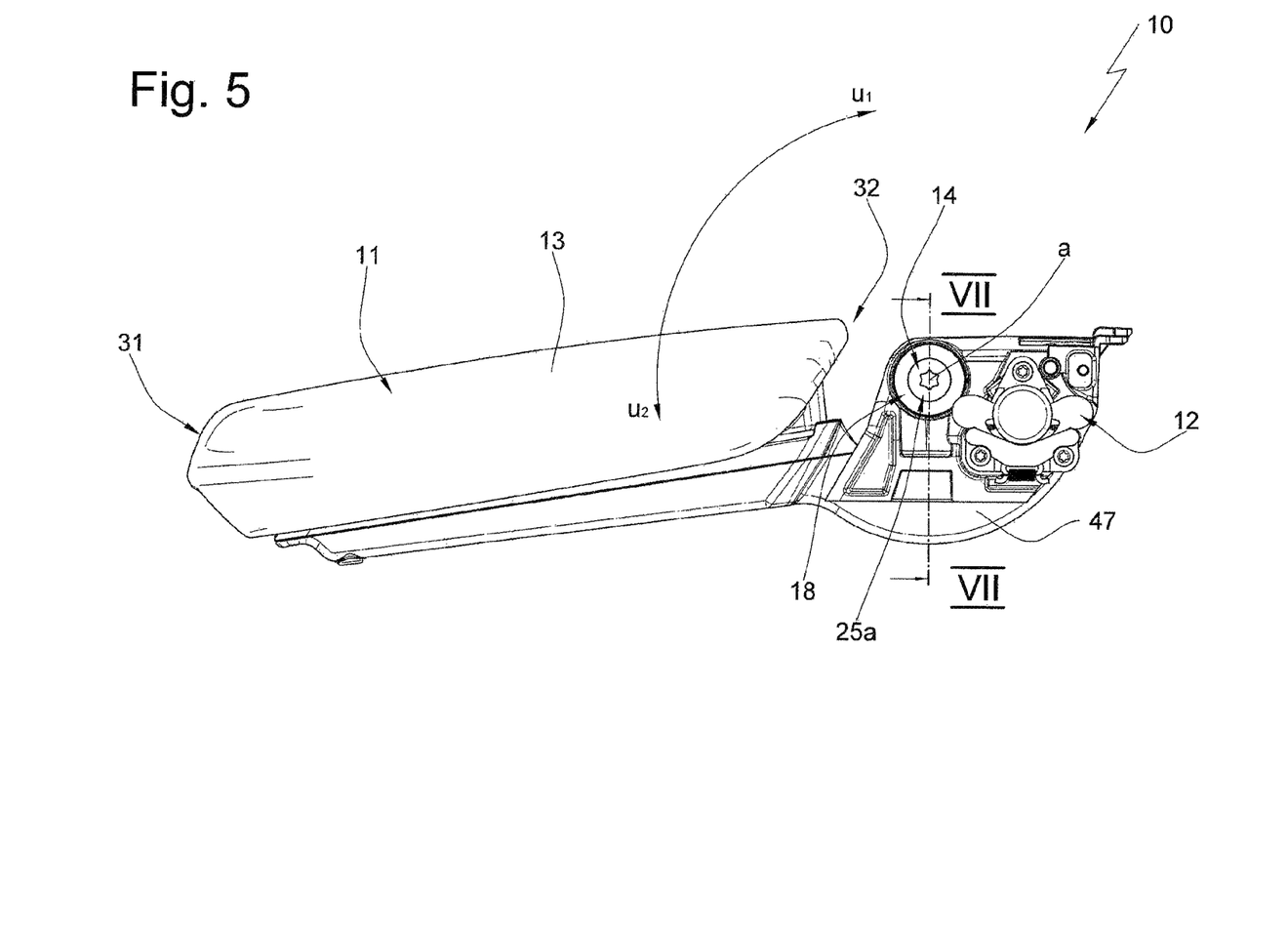
FIG. 5 is side view according to view arrow V of FIG. 3 with the arm in the first position.

Pivoting is ensured by bearing assemblies 20a and 20b (see for example FIG. 2). The bearing assemblies 20a and 20b are mirrorsymmetrically identical. Each bearing assembly 20a and 20b comprises a bearing pin 14 that passes through a hole 28 in the respective holding strut 25a and 25b of the support leg 12, engages in the bore 29 of the axis 48, and is screwed in place in this position.

The bearing assembly 20a is described by way of example below. The bearing pin 14 has with a head 19 as well as parts 15, 33, and 16. A longitudinal central axis of the bearing pin 14 forms the axis a. On the head 19, a retaining face 30 is formed that faces in the direction $y_1$ of the axis a and can absorb forces in the direction $y_2$. The interlocking part 15 is designed so as to be polygonal. The cylinder part 33 has a cylindrical surface 49 coaxial to the axis a. The connecting part 16 of the bearing pin 14 is provided with a screwthread 39. A shoulder 46 is formed between the interlocking part 15 and the cylinder part 33.

Each bore 29 has a screwthread 27 that engages with the screwthread 39 of the bearing pin 14. The circular cylinder part 33 of the bearing pin 14 engages in a center part 45 of the bore 29. As a result, the bearing pin is centered in the bore 29. The bearing pins 14 of the bearing assemblies 20a and 20b that are fixed to the arm 11, pass through the holes 28 in the holding struts 25a and 25b. Since the bearing pins 14a and 14b are rotatably connected to the arm 11, i.e. there is no relative rotation between the bearing pins 14 and the arm 11, the bearing pins rotate relative to the respective holding struts 25a and 25b around the axis a.

The bearing assembly 20a further comprises a bearing sleeve 22 having a tubular part 40 and an approximately disk-shaped flange 21. The bearing sleeve 22 has a central passage 26 through which the bearing pin 14 passes, and the tubular part 40 is coaxial to the interlocking part 15 of the bearing pin 14. An inner wall of the bearing sleeve 22 that faces the axis a is provided with an internal polygon 38 that engages with the polygon 37 of the bearing pin 14. Due to this interlocking, there is no relative rotation between the bearing pin 14 and the bearing sleeve 22.

The tubular part 40 has an outer surface 41 facing radially outward of the axis a. The outer surface 41 is in contact with an inner surface of the hole 28 in the holding strut 25a. When the arm is pivoted, there is a relative rotation around the axis a between the outer surface 41 and the inner surface of the hole 28.

Opposite the retaining face 30 of the bearing pin 14 that faces in the direction $y_1$, the flange 21 of the bearing sleeve 22 has a counterface 42 extending approximately parallel to the retaining face 30. A disk spring 18 is coaxial to the axis a between the retaining face 30 and the counterface 42. The bearing pin 14 and the tubular part 40 pass through a bore 17 of the disk spring 18. Since the disk spring 18 is braced between the retaining face 30 and the counterface 42, it rotates together with the bearing pin 14 and the sleeve 22. In other words, there is no relative rotation between bearing pin 14, bearing sleeve 22, and disk spring 18.

A stop face 43 is formed opposite the counterface 42 on the flange 21 and bears against a thrust face 34 of a thrust washer 23. A contact surface 35 of the thrust washer 23 that is opposite the thrust face 34 is in contact with an outer surface 36 of the holding strut 25 adjacent the hole 28.

The bearing pin 14, the disk spring 18, the sleeve 22, the thrust washer 23, and the bore 29 are coaxial to the axis a. The bearing pin 14 extends through the hole 17 of the disk spring 18, additionally passes through the central passage 26 of the sleeve 22 and passes through a hole 24 of the thrust washer 23.

Movement of the arm 11 between the lower position and the upper position causes the assembly rotatably connected to the arm 11 and consisting of the bearing pin 14, the disk spring 18, and the bearing sleeve 22 of the bearing assembly 20a to move relative to the thrust washer 23 and the holding strut 25a of the support leg 12. In the same manner, the assembly consisting of the bearing pin 14, the disk spring 18, and the bearing sleeve 22 rotates relative to the thrust washer 23 and the holding strut 25b of the support leg 12. The friction partners are thus defined and there is no unforeseen relative rotation between parts of the bearing assemblies 20a and 20b that generates unwanted noises.

The disk spring 18 of the bearing assembly 20a loads the arm 11 in the direction $y_1$, and the disk spring 18 of the bearing assembly 20b loads the arm in the direction $y_2$. Therefore, there can be no rattling of the armrest 10 due to axial movement of the arm 11.

For installing the arm 11 on the support leg 12, the disk spring 18, the bearing sleeve 22, and the thrust washer 23 are placed in order on the first part 15 of the bearing pin 14.

Subsequently, the bearing pin 14 and the tubular part 40 that coaxially surrounds the first part 15, are inserted through the hole 28. The bore 29 of the axle 48 and the hole 28 are arranged so as to align with one another. The second part 16 of the bearing pin is screwed into the bore 29, and the cylindrical part 33 of the bearing pin 14 interacts with the center part 45 of the bore 29. In this manner, both the bearing assembly 20*a* and the bearing assembly 20*b* are installed.

Figure 8:
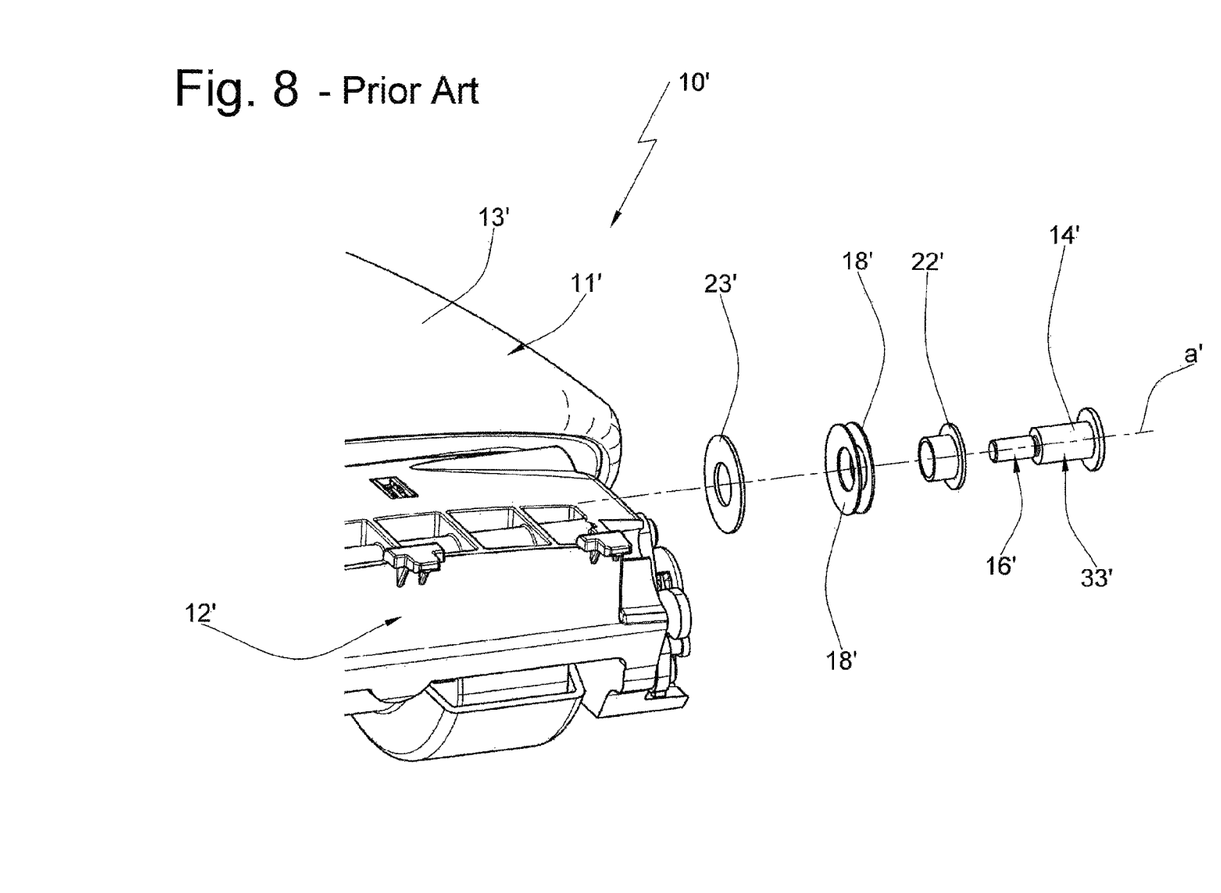
FIG. 8 shows a partially exploded perspective rear view of a prior-art armrest.

FIG. 8 shows an armrest 10' from the prior art. An arm 11' of the armrest 10' is pivotal about an axis a' on the holding struts of a support leg 12'. It is pivotably mounted by means of two opposing bearing assemblies. Each bearing assembly comprises a bearing pin 14' firmly screw-connected to the arm 11' and mounted in a hole of the holding strut. In this manner, the bearing pin 14' and the hole of the holding strut of both bearing assemblies form the axis a'.

The bearing pin 14' has a cylindrical part 33'. A bearing sleeve 22', two disk springs 18', and a thrust washer 23' are coaxial to the cylindrical part 33'. The bearing pin 14', the bearing sleeve 22', the disk springs 18', and the thrust washer 23' are rotatable around the axis a'. The head of the bearing pin 14' bears against the flange of the bearing sleeve 22' axially of the axis a. The flange is furthermore axially in contact with one of the disk springs 18'. A disk spring 18' axially bears against the thrust washer 23', and the thrust washer 23' is furthermore in contact with the support leg 12'. In the device from the prior at, relative movements can occur between the adjacent parts 12'/23', 23'/18', 18'/22', and 22'/14' that are in contact with one another, thus resulting in unwanted noises.

The invention claimed is:

1. A motor-vehicle accessory comprising;
a first part;
at least one second part; and
a bearing assembly supporting the first part in the second part for pivoting of the second part about an axis relative to the first part, the bearing assembly comprising a bearing pin on which a bearing sleeve is coaxial to the bearing axis, the bearing pin having a first coupling formation that engages in a second coupling formation of the bearing sleeve and prevents relative movement in a pivot direction between the bearing sleeve and the bearing pin.

2. The motor-vehicle accessory according to claim 1, wherein the first coupling formation is formed on an outer surface of the bearing pin, and the second coupling formation is formed on an inner surface of the bearing sleeve, the inner surface being in contact with the outer surface.

3. The motor-vehicle accessory according to claim 1, wherein the coupling formations are formed by teeth or polygonal supports.

4. The motor-vehicle accessory according to claim 1, wherein the bearing pin passes through a hole in a holding strut of a vehicle frame and engages in the arm.

5. The motor-vehicle accessory according to claim 1, wherein the bearing sleeve forms a flange with an axial counterface.

6. The motor-vehicle accessory according to claim 5, further comprising:
at least one functional element between the retaining face and the counterface.

7. The motor-vehicle accessory according to claim 6, wherein the functional element is a disk spring.

8. The motor-vehicle accessory according to claim 1, wherein the bearing pin is fixed to the first part or to the second part.

9. The motor-vehicle accessory according to claim 1, wherein the bearing assembly has a washer in contact with a vehicle frame in order to absorb and distribute forces acting on the vehicle frame.

10. An armrest for a vehicle wherein the armrest is a motor-vehicle accessory according to claim 1, a vehicle frame forming the first part and a pivotal arm forming the second part.

* * * * *